(12) United States Patent
Hippen et al.

(10) Patent No.: US 8,344,576 B2
(45) Date of Patent: Jan. 1, 2013

(54) ELECTRIC MOTOR ROTOR

(75) Inventors: Will Robert Hippen, Santa Barbara, CA (US); Franz Laimboeck, Goleta, GA (US); Peter Hofbauer, West Bloomfield, MI (US)

(73) Assignee: EcoMotors International, Allen Park, MI (US)

( * ) Notice: Subject to any disclaimer, the term of this patent is extended or adjusted under 35 U.S.C. 154(b) by 307 days.

(21) Appl. No.: 12/791,832

(22) Filed: Jun. 1, 2010

(65) Prior Publication Data

US 2010/0308685 A1  Dec. 9, 2010

Related U.S. Application Data

(60) Provisional application No. 61/217,674, filed on Jun. 3, 2009.

(51) Int. Cl.
*H02K 3/481* (2006.01)
(52) U.S. Cl. . 310/211; 310/214; 310/215; 310/216.061; 310/216.094; 310/216.008
(58) Field of Classification Search .................. 310/211, 310/214, 215, 216.061, 216.094, 216.008, 310/216.007, 216.015, 270, 271
See application file for complete search history.

(56) References Cited

U.S. PATENT DOCUMENTS

| | | | |
|---|---|---|---|
| 876,930 A * | 1/1908 | Bergman | 310/211 |
| 2,949,555 A | 8/1960 | Paul | |
| 3,694,906 A * | 10/1972 | Rank et al. | 29/598 |
| 4,341,966 A * | 7/1982 | Pangburn | 310/61 |
| 4,617,726 A | 10/1986 | Denk | |
| 4,769,993 A | 9/1988 | Kawamura | |
| 5,040,286 A | 8/1991 | Stark | |
| 5,300,845 A | 4/1994 | Fanning | |
| 5,605,045 A | 2/1997 | Halimi et al. | |
| 5,898,990 A | 5/1999 | Henry | |
| 5,906,098 A | 5/1999 | Woollenweber | |
| 6,177,748 B1 * | 1/2001 | Katcher et al. | 310/209 |
| 2006/0273683 A1 * | 12/2006 | Caprio et al. | 310/211 |

* cited by examiner

*Primary Examiner* — Quyen Leung
*Assistant Examiner* — Leda Pham
(74) *Attorney, Agent, or Firm* — Diana D. Brehob

(57) ABSTRACT

A rotor for use in an electrical motor which includes an anti-expansion ring centrally mounted on the rotor to restrict the extent rotor elements mounted on a rotatable shaft may expand outward due to centrifugal forces generated when the motor is operated. Such motors are suited for use in high rotational speed environments such as electrically controlled turbochargers.

15 Claims, 5 Drawing Sheets

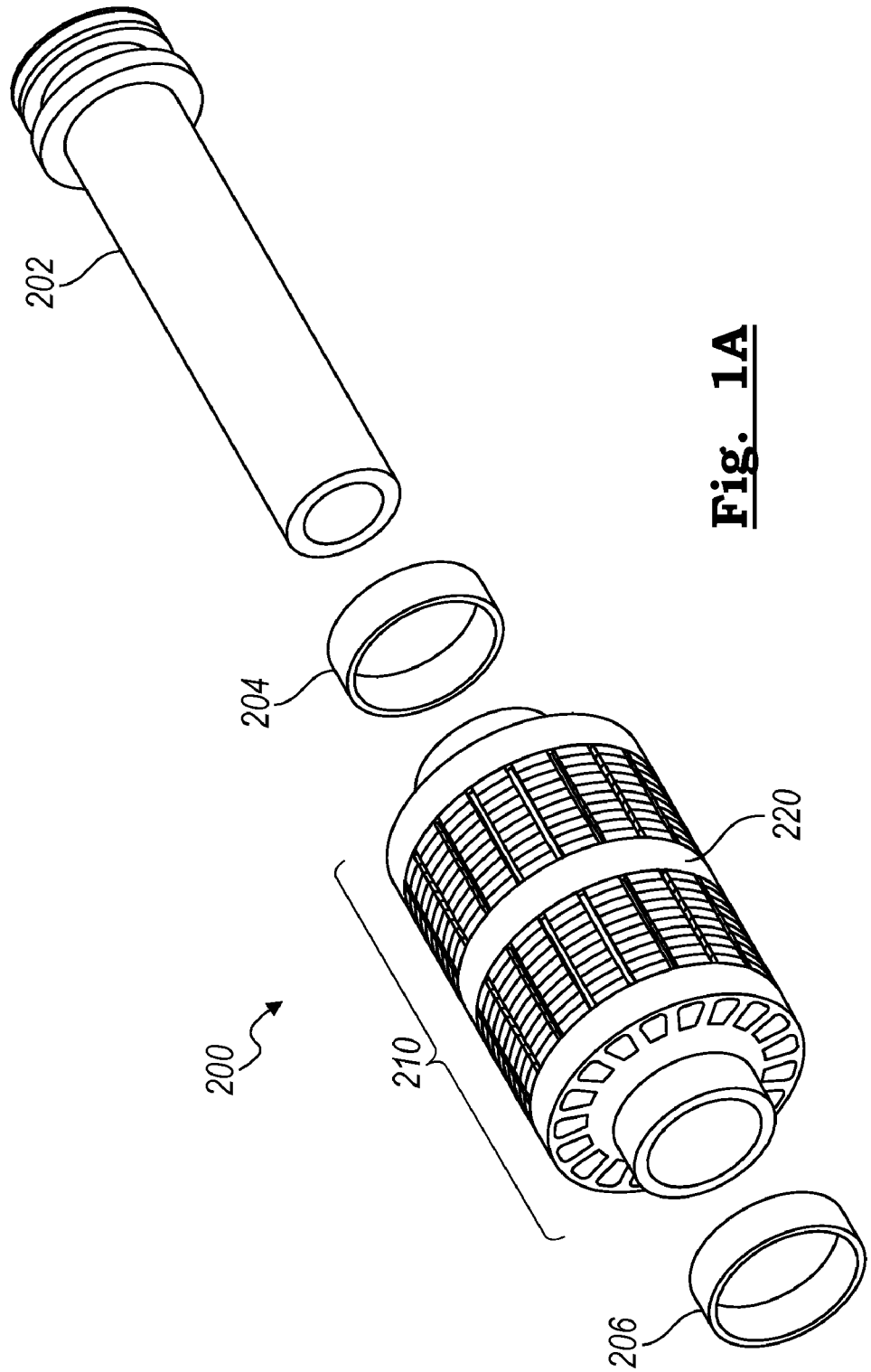

ELECTRIC MOTOR ROTOR

PRIORITY

This application claims benefit of U.S. provisional application Ser. No. 61/217,674 filed Jun. 3, 2009.

RELATED APPLICATION

This application is related to PCT/US10/2070 filed Jan. 21, 2010, which is incorporated herein by reference.

FIELD

This disclosure relates to the field of electric motors and more specifically to the area of rotors of such motors which contain magnetic field reactive elements suitable for high speed operations.

SUMMARY

Particularly challenging aspects in the design of the rotor of an electric motor that has the capability to be driven at high speeds approximating 100,000 rpms, concern the prevention of centrifugal forces from expanding the rotor elements in such a way as they become separated from the shaft to which they are attached. In the case of an induction motor, it is important to prevent expansion of the rotor elements from coming into contact with the stator element or from allowing the rods to cause shorting to the laminations. In the case of a permanent magnet motor, similar concerns apply and rotor expansion needs to be restricted.

Electric motor rotors disclosed herein are suitable for use in turbochargers and other environments where motors may be required to operate at significantly high speeds in the range of approximately 100,000 rpms and above. Typically, electrically controlled turbochargers employ a high speed electrical motor to rotate the turbo shaft which exists between the oppositely mounted compressor and turbine. In addition to the containment rings and stiffener improvements described in the above-referenced PCT/US10/2070 application to prevent rotor element detachment and reduce vibration effects on the shaft at high speeds, the embodiments disclosed here provide a center supporting ring on the rotor to provide additional restrictions to the rotor bars that minimize their outward deformation during high speed operations.

BRIEF DESCRIPTION OF THE DRAWINGS

FIGS. 1A and 1B are exploded views of components included in a rotor of an electric induction motor.

DETAILED DESCRIPTION

Figure 1B:
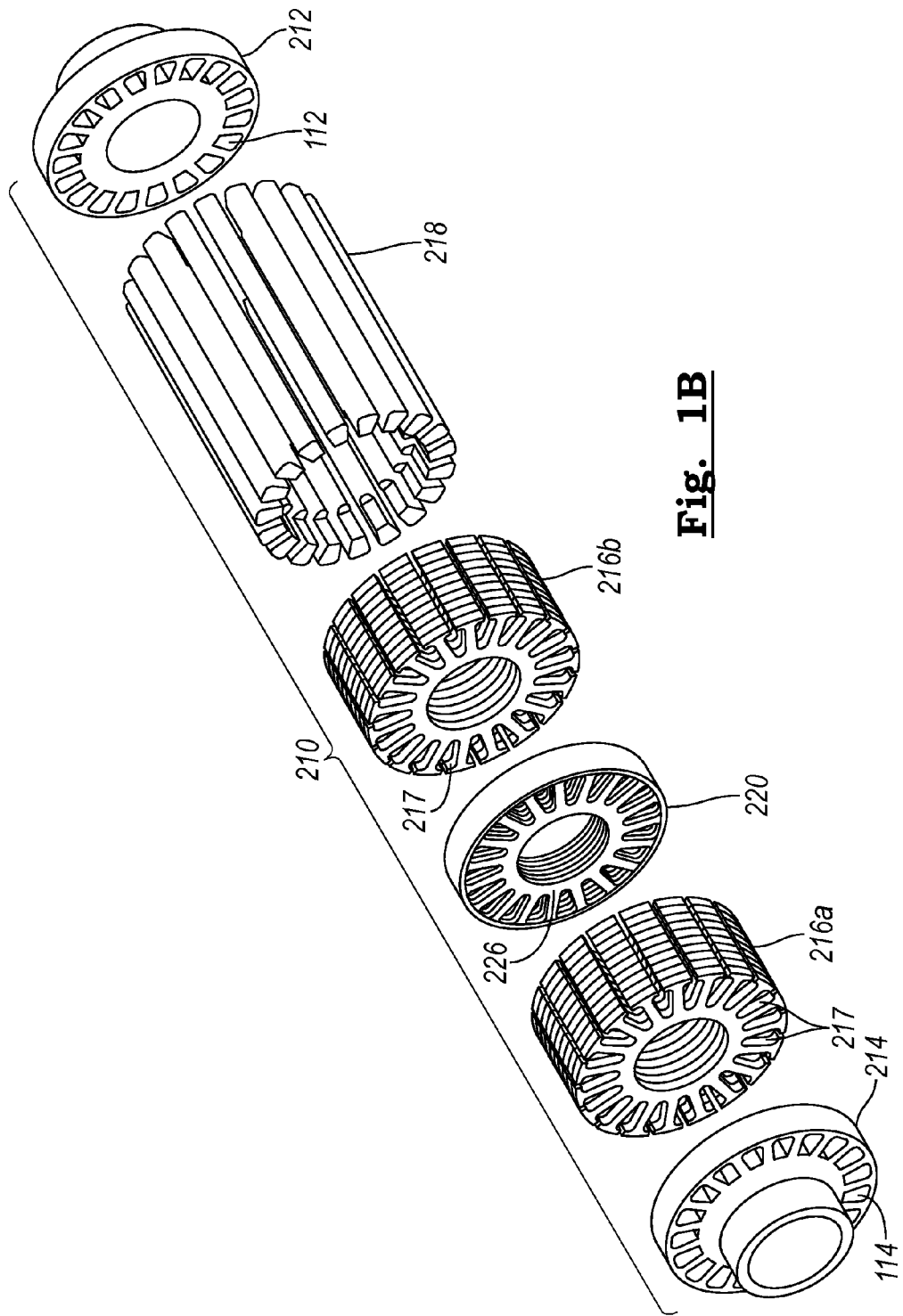
Figure 2:
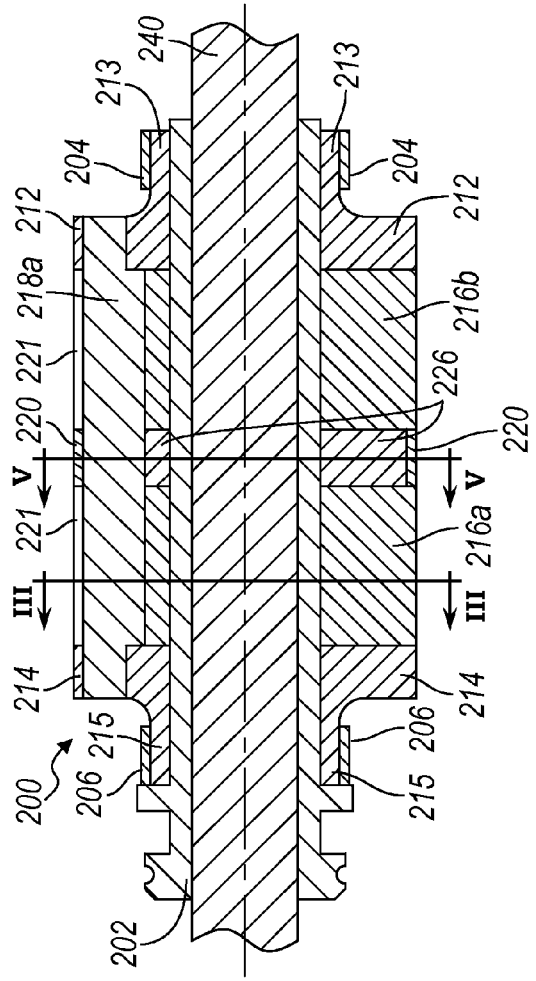
FIG. 2 is a cross-sectional plan view along the axis of an induction motor rotor assembly comprising the components shown in FIGS. 1A and 1B.

In FIG. 1A the major components of a rotor 200 of an electric induction motor include an assembled rotor element 210, containment rings 204 and 206 and stiffener sleeve component 202 for mounting on a rotor shaft 240 (FIG. 2).

In FIGS. 1B and 2, rotor element 210 is shown to include two balance rings 212 and 214 (also referred to herein as "end rings") having a plurality of apertures 112 and 114 (not visible in FIG. 2), a plurality of (19) rotor bars 218 (218a-218s), and a plurality of (65) steel laminations in sets 216a, 216b and 226 arranged in axially aligned stacks. A central supporting ring (also sometimes referred to herein as an anti-expansion ring) 220 is centrally located over lamination set 226 to minimize the effects of centrifugal forces from distorting the rotor bars 218 during high speed operations. FIG. 2 cross-sectional view is taken along the plane indicated with the dashed line "A" in FIG. 3 and the dashed line "C" in FIG. 5.

Steel laminations 216 can be formed of high strength electrical steel, such as Hyperco 50™, heat treated to provide maximum strength, and oxide coated to prevent electrical current losses between laminations. Rotor bars 218 can be made from a high strength to density ratio (specific modulus) and high electrical conductivity alloy, such as 2219 Al.

During assembly, rotor lamination sets 216a and 216b are coaxially arranged in stacks on either side of lamination set stack 226 which has the central supporting ring 220 located to surround the periphery of stack 226. Rotor bars 218 are inserted into (or molded in) slots 217 (217a-217s) and 227 (227a-227s). Balance rings 212 and 214 are installed on each end and the end of a rotor bar is received into each aperture 112 and 114 of the balance rings 212 and 214. The assembly is then clamped together axially to compress the laminations together. Rotor bars 218 are then welded to balance rings 212 and 214. Such welding may employ an electron beam process or any other process that provides effective high strength welding for such metals. Heat sinks are attached to the rotor during this process to minimize the distortional effects of welding. After welding, rotor 210 is machined on all outside surfaces and the ID to improve concentricity of the inside diameter ID and outside diameter OD, as well as balance.

Following machining, the rotor assembly 210 is slid onto the stiffener sleeve 202. The assembly is then balanced and the stiffener sleeve 202 is press fitted onto shaft 240. While there may be some tolerance between the stiffener sleeve 202 and the ID of the laminations to prevent pre-stress in the laminations, the balance rings 212 and 214 are press fitted onto the sleeve 202 in order to secure the rotor assembly 210 to shaft 240 under all operational circumstances.

Rotor 210 can also possibly be made in a high pressure die casting where the rotor laminations 216 and 226 are placed in a die and molten aluminum is injected into the slots 217 and 227 to form the rotor bars 218, as well as end rings 212 and 214.

The end rings 212 and 214 are preferably fabricated from the same or similar alloy used to fabricate the rotor bars 218 and serve to minimize expansion of the rotor ends during high speed operations.

To further mitigate the effects of centrifugal forces generated at high rotational speeds, the end rings 212 and 214 can be extended axially 213 and 215 from each end of the rotor. Extensions 213 and 215 are much smaller in diameter than the main body of the end rings. By making end ring extensions 213 and 215 smaller in diameter, the extensions experience much less centrifugal force and therefore retain their press fit onto the stiffener 202 and shaft 240 throughout the broad range of speed operations.

For extra security, containment rings 204 and 206 formed of high strength steel may be clamped around the balance rings 212 and 214 to ensure the integrity of the press fit between balance rings, stiffener sleeve 202 and shaft 240. In FIGS. 1A and 2, containment rings 204 and 206 are located on end ring extensions 213 and 215.

When employed in an electrically controlled turbocharger design, motor rotors are usually elongated. There is a concern that longer rotor bars, such as those designated as 218 in FIGS. 1A, 1B and 2, will be subject to large centrifugal forces at high rpm operating speeds that could cause the central portions of the rotor bars to be forced radially outward sufficiently to distort the motor/stator air gap. If such distortion occurs, and the outer diameter of the rotor is allowed to expand too much, it could cause contact with the stator. In addition, large outward forces could wear against the isolated coating on the insides of slots 217 and eventually cause shorting between laminations and rotor bars.

While the end rings 212 and 214 serve to restrain expansion of the ends of rotor rods 118, an anti-expansion ring 220 that is centrally located on the rotor restricts the outward movement of the remainder of the rotor rods 218. FIGS. 1A, 1B and 2 illustrate the central location of anti expansion ring 220 with respect to the other elements.

Figure 3:
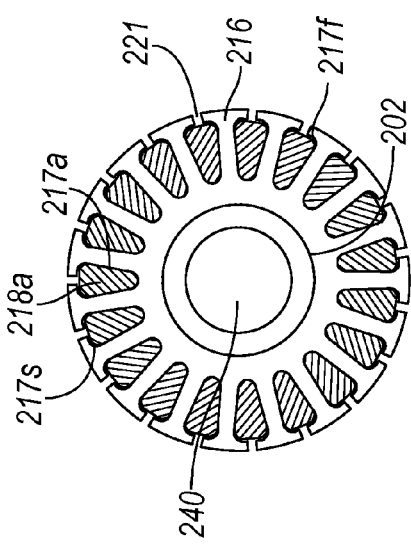
FIG. 3 is a plan view of a lamination taken along section line III-III in FIG. 2.

In FIG. 3, a plan view of a lamination 216 taken along section line III-III in FIG. 2 shows the circular distribution of the nineteen slots 217a-217s. Lamination 216 is identical to all other laminations in lamination sets 216a and 216b. In that view, the stiffener 202 is shown surrounding the rotor shaft 240. Rotor bars 218a-218s are inserted into the corresponding slots 217a-217s.

Figure 4:
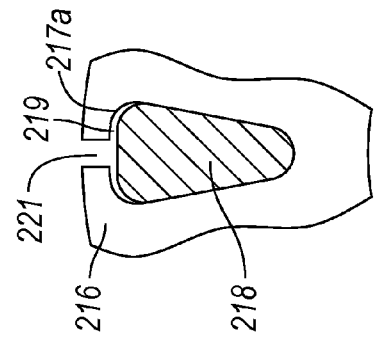
FIG. 4 is an enlarged view of a lamination aperture from FIG. 3, containing a rotor bar.

As can be seen in FIG. 4, the enlarged view of a slot 217 in lamination 216 is radially oriented and slightly truncated towards the axis. Due to the effect of anti-expansion ring 220 pressing against the central portion of rotor bars, the rotor bars in lamination sets 216a and 216b are compressed towards the lower end of slot 217 closest to the rotor axis. This compression leaves an air space 219 between the outer rotor bar surface and outer end of the slot 217. A conventional air gap 215 is shown as being spaced away from the rotor bar 218.

Figure 6:
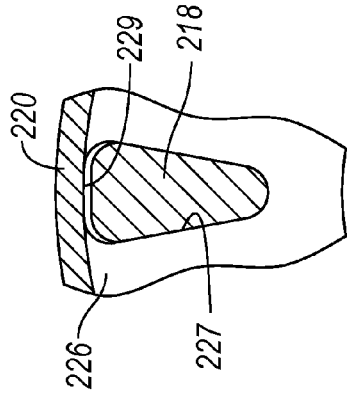
FIG. 6 is an enlarged view of a lamination aperture from FIG. 5, containing a rotor bar.
Figure 5:
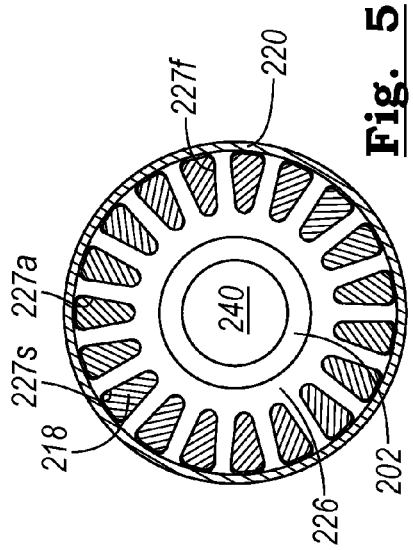
FIG. 5 is a plan view of a lamination and center supporting ring taken along section line V-V in FIG. 2.

In FIG. 5, a plan view of a lamination 226 taken along section line V-V in FIG. 2 shows the distribution of the 19 slots 227a-227s. Lamination 226 is identical to all other laminations in the central lamination set below anti-expansion ring 220. Lamination 226 surrounds stiffener 202 which is press fitted to the rotor shaft 240 (or to the shaft 340 in FIG. 7). Rotor bars 218a-218s are inserted in to the corresponding slots 217a-217s. Lamination 226 and all others in the central lamination set are somewhat different than those in FIGS. 3 and 4, due to the placement and accommodation of the anti-expansion ring 220. As can be seen in the enlarged view of a slot 227 in FIG. 6, the outer diameter of the lamination has been reduced by the thickness of the anti-expansion ring 220 as indicated by dashed line "B" in FIG. 4. The air gap portion (215 shown in lamination 216 of FIG. 4) is removed so that the anti-expansion ring 220 is in direct contact with rotor bar 218. In this configuration, the combined OD of lamination 226 and anti-expansion ring 220 is the same as lamination 216 in lamination sets 216a and 216b.

Anti-expansion ring 220 is preferably formed of high strength steel that is selected to also have a low coefficient of thermal expansion in order to minimize expansion of the rotor assembly 200.

Figure 7:
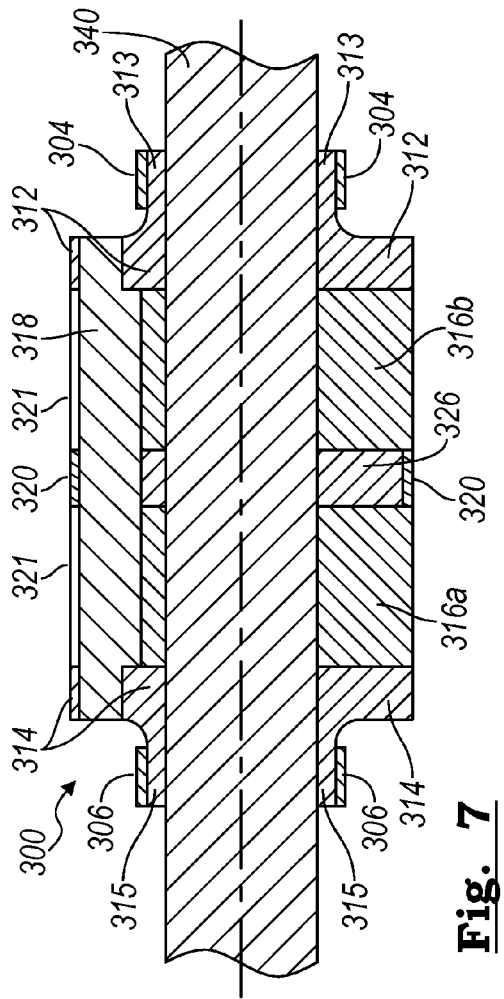
FIG. 7 is a cross-sectional plan view along the axis of an induction motor rotor assembly mounted directly on a shaft.

FIG. 7 illustrates a rotor assembly 300 that is mounted directly on rotor shaft 340, in such environments where a stiffening component is not required to control vibration at operational speeds. Rotor assembly 300 shown to include two balance rings 312 and 314, a plurality of rotor bars 318 and a plurality of steel lamination sets 316a, 316b and 326 arranged in axially aligned stacks. A central supporting ring 320 is centrally located over lamination set 326 to minimize the effects of centrifugal forces from distorting the rotor bars 318 during high speed operations. As in the earlier described embodiment, extensions 313 and 315 are much smaller in diameter than the main body of the end rings 312 and 314 to reduce the mass surrounding the press fit to shaft 340.

Figure 8:
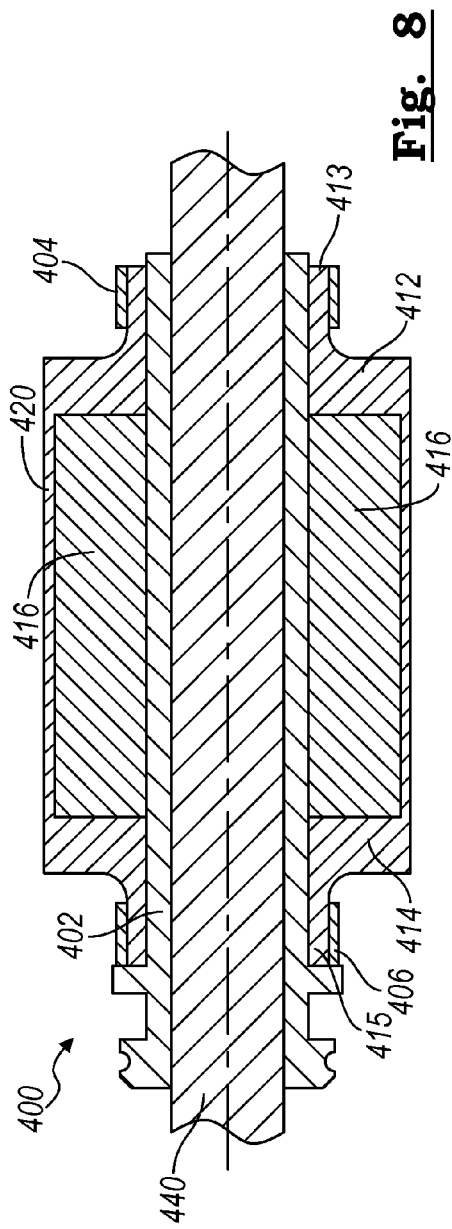
FIG. 8 is a cross-sectional plan view along the axis of a rotor assembly of a permanent magnet motor mounted on a shaft stiffener.

FIG. 8 illustrates the principles noted above applied to the rotor 400 of a permanent magnet motor. In this embodiment, a stiffener component 402 is press fit to a rotor shaft 440. A high strength steel cylindrical sleeve 420 extends from and between end rings 412 and 414 to surround the magnetic material 416. In this manner, the sleeve acts to limit the amount of expansion that the rotor will incur due to centrifugal forces imparted at high operational speeds. End rings 412 and 414 employ the reduced mass extensions 413 and 415 described above. For extra security, containment rings 404 and 406 formed of high strength steel may be clamped around the end rings 412 and 414 to ensure the integrity of the press fit between end rings 412 and 414, stiffener sleeve 402, and shaft 440. Containment rings 404 and 406 are located on end ring extensions 413 and 415.

Figure 9:
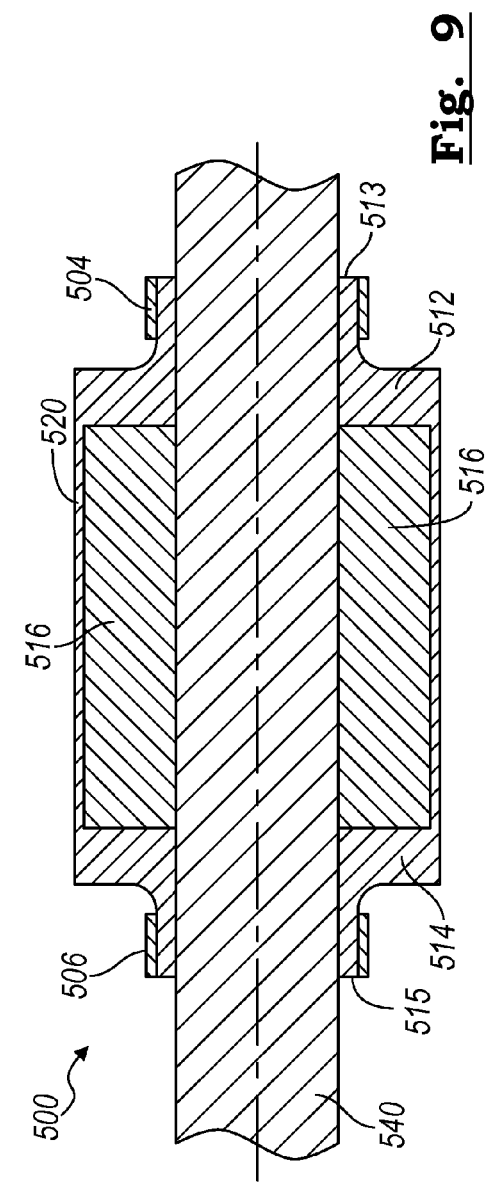
FIG. 9 is a cross-sectional plan view along the axis of a rotor assembly of a permanent magnet motor mounted directly on a shaft.

FIG. 9 illustrates a rotor assembly 500 that is mounted directly on rotor shaft 540, in such environments where a stiffening component is not required to control vibration at operational speeds. In this embodiment, a high strength steel cylindrical sleeve 520 extends from and between end rings 512 and 514 to surround the magnetic material 516. In this manner, the sleeve acts to limit the amount of expansion that the rotor will incur due to centrifugal forces imparted at high operational speeds. End rings 512 and 513 employ the reduced mass extensions 513 and 515 described above. Containment rings 504 and 506, preferably of high strength steel are located on end ring extensions 513 and 515.

The embodiments shown here are exemplary in nature and shall not be considered to be a restriction on the scope of the claims set forth herein.

The invention claimed is:

1. A rotor assembly for an electrical induction motor, the rotor assembly comprising:
   an axially stacked lamination core;
   a plurality of rotor bars; and
   an annular restraining ring element wherein:
      said axially stacked lamination core contains a plurality of sets of laminations;
      each lamination of said axially stacked lamination core containing a plurality of slots for receiving and retaining a corresponding plurality of said rotor bars in said lamination slots;
      said sets of laminations comprise a first and second set of laminations each having a first outside diameter dimension, and a third set of laminations located centrally between said first and second sets of laminations in said axial stack and said third set of laminations having a second outside diameter dimension, wherein said first outside diameter dimension is greater than said second outside diameter dimension; and
      said annular restraining ring element has an inner diameter dimension substantially equal to said second outside diameter dimension, a radial thickness dimension no greater than the difference between said first and second outer diameter dimensions, and surrounds said third set of said laminations to restrict outward movement of said rotor bars in said slots.

2. A rotor assembly as in claim 1, wherein each of said lamination slots in said first and second sets of laminations substantially surround a portion of said rotor bars and said annular restraining ring element restricts the movement of said rotor bars against the outer portions of said lamination slots during high speed rotation of said rotor.

3. A rotor assembly for an electrical induction motor, comprising:
an axially stacked lamination core;
a plurality of rotor bars; and
and an annular restraining ring element wherein
said axially stacked lamination core contains a plurality of sets of laminations;
each lamination of said axially stacked lamination core contains a plurality of slots for receiving and retaining a corresponding plurality of said rotor bars in said lamination slots;
said sets of laminations comprise a first and a second set of laminations each having a first outside diameter dimension, and a third set of laminations located centrally between said first and second sets of laminations in said axial stack and said third set of laminations having a second outside diameter dimension;
said first outside diameter dimension is greater than said second outside diameter dimension;
said annular restraining ring element has an inner surface in contact with said rotor bars and an outer diameter dimension that is less than or equal to said first outside diameter dimension; and
said annular restraining ring element surrounds said third set of said laminations to restrict outward movement of said rotor bars in said slots.

4. A rotor assembly as in claim 3, wherein said slots in said third set of laminations that retain said rotor bars each have an opening on the outer radial edge of the corresponding lamination to allow a portion of the rotor bar surface to be in contact with said annular restraining ring element.

5. A rotor assembly for an induction motor, the rotor comprising:
a first set of laminations having an outside diameter equal to a first diameter;
a second set of laminations having an outside diameter substantially equal to the first diameter;
a third set of laminations having an outside diameter equal to a second diameter with the second diameter being less than the first diameter wherein the lamination sets are aligned axially with the third set of laminations located between the first and second sets of laminations;
a plurality of rotor bars, the first, second, and third sets of lamination define openings into which the rotor bars are inserted; and
an annular restraining ring placed over the third set of laminations with an outer diameter of the annular restraining ring being substantially equal to the first diameter.

6. The rotor assembly of claim 5 wherein an inner diameter of the annular restraining ring is substantially equal to the second diameter.

7. The rotor assembly of claim 5 wherein the outside diameter of the first and second sets of laminations substantially equals the first diameter proximate the third set of laminations and a smaller diameter distal from the third set of laminations, the assembly further comprising:
containment rings over the first and second sets of laminations over the portion of the first and second set of laminations with the smaller diameter.

8. The rotor assembly of claim 5 wherein the first, second, and third sets of laminations defining a central opening, the assembly further comprising:
a shaft inserted into the central opening.

9. The rotor assembly of claim 5 wherein the first, second, and third sets of laminations defining a central opening, the assembly further comprising:
a shaft; and
a stiffener sleeve placed over the shaft with the assembled shaft and stiffener sleeve inserted into the central opening in the laminations.

10. The rotor assembly of claim 5, further comprising:
a first balance ring having an end ring extension with the first balance ring adjacent the first plurality of laminations; and
a second balance ring having an end ring extension with the second balance ring adjacent the second plurality of laminations.

11. The rotor assembly of claim 10, further comprising:
a first containment ring on the end ring extension associated with the first balance ring; and
a second containment ring on the end ring extension associated with the second balance ring.

12. A rotor of an electric machine, comprising:
a first plurality of laminations arranged axially;
a second plurality of laminations arranged axially;
a third plurality of laminations arranged axially with the third plurality of laminations located between the first and second pluralities of laminations wherein a plurality of longitudinal slots are defined in the first, second, and third pluralities of laminations; and the third plurality of laminations has a smaller outside diameter than the first and second pluralities of laminations;
a plurality of rotor bars inserted into the slots defined in the laminations;
a first balance ring having an end ring extension with the first balance ring adjacent the first plurality of laminations;
a second balance ring having an end ring extension with the second balance ring adjacent the second plurality of laminations;
a first containment ring on the end ring extension associated with the first balance ring;
a second containment ring on the end ring extension associated with the second balance ring; and
an annular restraining ring placed on an outside surface of the third plurality of laminations.

13. The rotor assembly of claim 12 wherein the first, second, and third sets of laminations defining a central opening, the assembly further comprising:
a shaft inserted into the central opening.

14. The rotor assembly of claim 12 wherein the first, second, and third sets of laminations defining a central opening, the assembly further comprising:
a shaft; and
a stiffener sleeve placed over the shaft with the assembled shaft and stiffener sleeve inserted into the central opening in the laminations.

15. The rotor assembly of claim 12 wherein
the first and second balance rings define a plurality of apertures; and
the plurality of apertures in the first and second balance rings engage with the rotor bars.

* * * * *